H. A. Wells.
Felting Machine.
No. 2245        Patented Sep. 11, 1841.

UNITED STATES PATENT OFFICE.

HENRY A. WELLS, OF NEW YORK, N. Y.

MACHINE FOR SHRINKING BODIES IN THE MANUFACTURE OF FELT-CLOTH AND HAT-BODIES.

Specification of Letters Patent No. 2,245, dated September 11, 1841.

*To all whom it may concern:*

Figure 1:
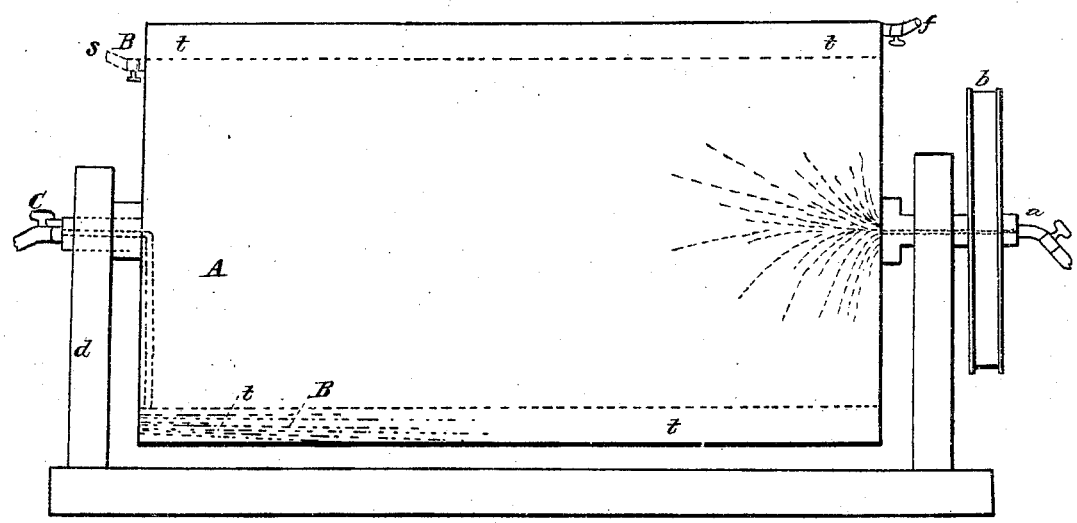
Figure 2:
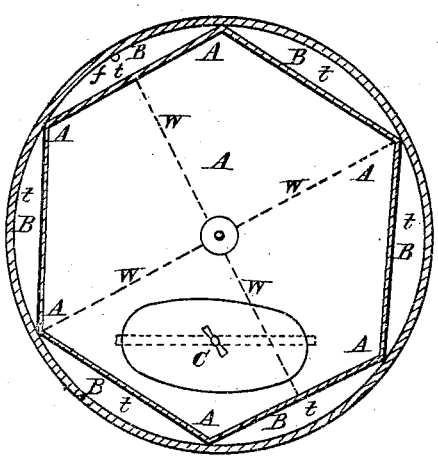

Be it known that I, HENRY AUGUSTUS WELLS, of the city, county, and State of New York, have invented an improvement in machines heretofore used for shrinking bodies and napping hat-bodies and which, with this improvement, I use in my method of manufacturing cloth or other fabrics, as described in my specification bearing even date herewith and designated as a "fulling machine or cylinder or double drum;" and I do hereby declare that the following is a full and exact description thereof, Plate I, Figure 1, being a side view and Fig. 2 an end view, the end being supposed to be transparent.

An ordinary hollow metallic cylinder B, Figs. 1 and 2, is supported or suspended on two uprights $a$, $a$ and is made to revolve in slot bearings in those uprights by a pulley $b$ (which gets its motion in any convenient manner) or by any other convenient means, in the inside of this cylinder a hollow hexagonal metallic prism A, Fig. 2, is constructed of which the outer edges or angles are securely fastened to the interior of the cylinder so as to revolve with it and the prism is of equal length with the cylinder and its ends are soldered to the ends or heads of the cylinder so as to prevent any communication between them this cylinder may have any other convenient angular figure or polygon for its base into this interior space thus formed the article to be operated upon is placed through the door C, Fig. 2, which can be tightly closed—through one of the journals a pipe passes with a stop cock $a$ Fig. 1 by this means steam is admitted into the interior of the machine a stop cock S Fig. 1 allows the steam and water to escape from the interior when required through the other journal a pipe passes with a stop cock C this pipe is bent so soon as it reaches the interior of the machine and passing along the inner side of that head or end of the machine leads through one of the sides of the prism and admits steam into one of the spaces $t$ Figs. 1 and 2, between the cylinder and the prism and small openings being left in the edges of the prism which are there made thick for that purpose the steam finds its way into those spaces $t$ $t$ without escaping into the prism and by this means a dry heat can be produced within the prism, a stop cock $p$ Fig. 1, allows the steam and water to escape from the spaces $t$ $t$ when required the machine may have an oscillating motion given it so as to cause its ends to rise and fall alternately from twenty to twenty five degrees this is done by means of cranks a bent axle or in any other convenient manner.

In order to use this machine the article to be fulled or hardened either rolled up in canvas or cotton, or linen cloth or not as is thought advisable is placed in it through the door C Fig. 1 steam admitted through the pipe and stop cock $a$ Fig. 1 and the machine is set in motion and has at the same time a convenient and proper rotary and oscillating motion and the article to be operated upon is thrown violently against the sides and ends of the machine while it is kept warm and moist by the steam when the moist heat has been continued long enough the stop cock $a$ is closed the steam (and water rising from its condensation) is allowed to escape through the stop cock S Fig. 1, and when it has escaped this stop cock is closed the stop cock at C, Fig. 1, being then opened the spaces $t$ $t$ are kept filled with steam and the motion of the machine is kept up by which the article inside is kept in motion and subjected to a powerful dry heat by these operations the article is fulled or shrunk to a considerable degree when this has been continued long enough the machine is stopped the stop cock C is closed and the steam (and water arising from its condensation) escape through the stop cock $f$ Fig. 1. The goods are then taken out and the machine is immediately ready for the reception of other articles.

The machine may be made of great diameter say twelve or fourteen feet or even larger and then the interior being divided into several compartments by partitions $w$ $w$, Fig. 2, several pieces of goods may be subjected to the action of the machine at the same time or several pieces may be operated upon at the same time without compartments.

The effect proposed by this mode of operation is to make the material shrink contract or felt, by the direct application of the steam and this is accelerated and fixed by the applicaion of dry heat afterward produced by the steam in the spaces $t$, the rotating and alternating motion of the drum, or vessel, being designed to turn over the material and expose it on all sides to the action of the steam and heat.

The principle of this improvement which I claim as my invention consists in the mode of operation whereby the material to be shrunk contracted or felted with rapidity and evenness is subjected to the direct action of steam and afterward only to a dry heat in a double vessel kept all the time in motion so that the material may be exposed on every side to the action of the steam heat during the operation as aforesaid. It is obvious that an outer and inner vessel of any form, and dimensions may be used and yet the principle be the same. I have described the form I prefer. But

I claim as my invention—

The use of any mechanical means, operating substantially in the same mode to produce the same effect.

Witness my hand this sixth day of August, in the year of our Lord one thousand eight hundred and forty one.

H. A. WELLS.

Witnesses:
W. R. BREUER,
C. B. TABISKI.